(12) United States Patent
Mitsuya et al.

(10) Patent No.: US 6,556,229 B2
(45) Date of Patent: Apr. 29, 2003

(54) ELECTROPHOTOGRAPHIC APPARATUS HAVING A FRINGE DEVELOPMENT PREVENTING MECHANISM

(75) Inventors: Teruaki Mitsuya, Ibaraki (JP); Nobuyoshi Hoshi, Ibaraki (JP); Hisao Okada, Ibaraki (JP); Yoshihiko Sano, Ibaraki (JP); Shinichi Akatsu, Ibaraki (JP); Shinya Kobayashi, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/833,811

(22) Filed: Apr. 13, 2001

(65) Prior Publication Data

US 2001/0030680 A1 Oct. 18, 2001

(30) Foreign Application Priority Data

Apr. 14, 2000 (JP) ........................................ 2000-113166

(51) Int. Cl.[7] .............................................. G03G 15/01
(52) U.S. Cl. ...................... 347/115; 347/132; 347/140; 399/51; 399/232
(58) Field of Search ........................... 399/232, 51, 55; 347/115, 129, 131, 132; 340/140

(56) References Cited

U.S. PATENT DOCUMENTS 5,305,069 A * 4/1994 Nakano ....................... 347/115
5,884,119 A * 3/1999 Maruo et al. ................. 399/51

FOREIGN PATENT DOCUMENTS

JP 11-102099 * 4/1999

* cited by examiner

*Primary Examiner*—Joan Pendegrass
(74) *Attorney, Agent, or Firm*—Sughrue Mion, PLLC (57) ABSTRACT

In an electrophotographic apparatus, regions having at least three different potential levels Vc, Vw, and Vr are formed on a photosensitive member by using an exposing device, and developing processes respectively using colored particles of different kinds are performed by normal development and reversal development on two potential levels Vc and Vr excluding the intermediate potential level Vw. The apparatus has an auxiliary exposing unit for forming a fringe development preventing potential in an edge of an image forming region in order to prevent fringe development from occurring. The auxiliary exposing unit sets an auxiliary exposure amount by performing pulse-width modulation on a laser driver.

6 Claims, 7 Drawing Sheets

ELECTROPHOTOGRAPHIC APPARATUS HAVING A FRINGE DEVELOPMENT PREVENTING MECHANISM

BACKGROUND OF THE INVENTION

1. Field of the Invention

The present invention relates to an electrophotographic apparatus (recording apparatus of an electrophotographic method) which is used in a printer, a facsimile apparatus, a copier, or the like, and more particularly to an electrophotographic apparatus of a potential dividing development method which is a development method wherein an image is developed by using colored particles such as a toner, and in which, as in the case of two-color printing, electrostatic latent images are formed with dividing the surface potential of a photosensitive member into plural levels (so-called potential division) and the electrostatic latent images are developed by toners of different colors that are oppositely charged.

2. Description of the Related Art

A conventional development method and a potential dividing development method which are used in a conventional electrophotographic apparatus will be described.

A recording apparatus using the electrophotographic method implements the steps of: forming an electrostatic latent image on a recording member (photosensitive member); attaching colored particles to the electrostatic latent image in the surface of the recording member to develop the latent image as an image; transferring the developed colored particle image to another recording member; and fixing the transferred colored particle image. As the colored particles, powder dedicated to electrophotography and called a toner is used.

In the developing step, first, toner particles serving as colored particles are charged by using a developer in the following manner. The developer is a mixed powder of a toner and carrier beads which are magnetic particles. The developer is loaded into a developing unit, and then stirred therein to be charged by friction with the carrier beads.

In the developing process, the whole surface of the photosensitive member is once charged, and the photosensitive member is then irradiated (exposed) with light to cause partial discharging in accordance with image data. As a result, a potential contrast caused by a charged region and a discharged region is formed in the surface of the photosensitive member. The potential contrast is called an electrostatic latent image.

The image formation in the developing step is performed by moving the electrostatic latent image on the surface of the photosensitive member to a position (developing position) which is opposed to a magnet roller called a developing roller and transporting the developer. In the image forming process, a method called a bias development is usually used.

In the bias development, a bias voltage is applied to the developing roller to produce an electric field between the latent image potential formed in the surface of the photosensitive member and the developing roller, and the charged toner particles are separated from the developer on the surface of the developing roller to be moved to the surface of the photosensitive member by the function of the electric field, thereby forming an image. The difference between the bias voltage of the developing roller and the potential of the image forming portion of the photosensitive member is called the development potential difference.

It is a matter of course that, when the development potential difference is large, the formed electric field (called the development electric field) is enhanced and hence the developing performance is improved. Also when a method in which the distance between the developing roller and the photosensitive member is reduced, or that in which the electric resistance of the developer is lowered is employed, the same effect of enhancing the development electric field is attained so as to improve the developing performance.

As a modification of the above-described electrophotography bias development method, a development method has been proposed in, for example, JP-A-48-37148. In the proposed method, the potential of a charged region and a discharged region is divided by two, an intermediate potential region is disposed between the regions, a first developing unit which develops the discharged region (this development is called reversal development) is disposed to perform development using a first toner, and a second developing unit which develops the charged region (this development is called normal development) is disposed to perform development using a second toner, whereby toner developments of two kinds are conducted by one charging step and one light-irradiating step (exposing step).

In this development method, the toner is not attached to the intermediate potential region (referred to as the intermediate potential) on the photosensitive member and having a voltage which is between the bias voltage of the reversal developing unit (first developing unit) and that of the normal developing unit (second developing unit), to form the background portion as an image. Therefore, it is possible to form an image of two kinds of toners and composed of the background portion, a first image portion, and a second image portion. In the specification, this development method is referred to as the potential dividing development method.

In the potential dividing development method, generally, the two kinds of toners are configured by toners of different colors, respectively, and used for obtaining an image composed of two colors. Alternatively, the first development may be performed as the normal development, and the second as the reversal development. Also in the alternative, the potential dividing development is enabled.

In the bias development, when an electrostatic latent image is formed on a photosensitive member, an electric field emphasizing the development in end portions of the potentials (potential edges) of the latent image is produced, and at the same time an electric field of a polarity opposite to that of the latent image (reverse electric field) is produced in the periphery of the latent image. This reverse electric field is produced because the development is performed by an electric field which is formed by spatially differentiating the potential distribution, and hence a field emphasized region and an electric field the polarity of which is opposite to that of the emphasized region are produced in potential edges (the boundary between the potential of the charged or discharged region serving as the latent image region and the intermediate potential) of the image regions where the development potential is changed.

In the bias development in which the potential dividing development method is not used and only one kind of toner is used, the reverse electric field does not present a problem. By contrast, in the electric potential dividing development process in which positive and negative electrostatic latent images are formed on the photosensitive member, and development is performed by using two kinds of toners (hereinafter, description will be made with taking red toner and black toner as an example) that are charged in polarities respectively opposite to the polarities of the latent images, fringe development occurs in which the red toner is attached to the periphery of a black image and the black toner is attached to that of a red image by attraction due to the reverse electric fields.

The fringe development appears as erroneous printing in which toner is attached to an unexpected position. In order to solve this problem, a method may be employed in which an electric potential dividing development method without fringe development is realized by introducing an exposure control (hereinafter, often referred to as fringe control) wherein an expected position of occurrence of fringe development is predicted and auxiliary exposure is applied to the expected position to suppress a reverse electric field. In the auxiliary exposure, exposure is performed while controlling the auxiliary exposure amount so as to stepwise relax the development potential difference (the difference between the potential of the charged or discharged region and the intermediate potential) adjacent to the development potential edge of a latent image (image region). This will be described in detail with reference to the drawings in the paragraph of embodiments of the invention.

The auxiliary exposure is applied to both or one of the fringe surrounding the red image and that surrounding the black image. When the fringe control is used, there arises a further problem in that a reverse electric field generated by the potential difference (the difference between the potential of an auxiliary exposure region and the intermediate potential) due to auxiliary exposure causes additional fringe-like erroneous printing.

In the specification, fringe-like erroneous printing caused by auxiliary exposure is called a repulsive fringe. In order to distinguish from a repulsive fringe, a fringe which is caused when auxiliary exposure is not applied is called a primary fringe. In the following description, when referred to merely as fringes, it generally means both the kinds of fringes.

In the fringe control, there is a Wade-off relationship in which, as the difference between the potential due to auxiliary exposure and the intermediate potential is larger (in other words, as the difference between the potential of a latent image region and the potential due to auxiliary exposure is smaller), a primary fringe is more susceptible to extinguish, and a repulsive fringe is correspondingly more susceptible to be produced. When, in order to simultaneously prevent primary and repulsive fringes from occurring, the auxiliary exposure amount is set so that the fringes are substantially equal in degree to each other, the fringe control can attain the maximum effect. Because of this consideration for a repulsive fringe, the effect of the fringe control has its upper limit, and there is a problem in that, even when primary and repulsive fringes are made equal in degree to each other, fringes sometimes occur according to the situation. In the case where only one kind of the auxiliary exposure amount can be applied, the difference between the potential due to auxiliary exposure and the intermediate potential cannot be set to a very small degree (can be set to about one half of the difference between the latent image potential and the intermediate potential), and it may be therefore impossible to sufficiently suppress a repulsive fringe. As a countermeasure, the amount of light of auxiliary exposure may be set to have either of multi levels so that the potential due to auxiliary exposure is made stepwise closer to the intermediate potential as the exposed position is more remote from the position where a primary fringe is suppressed. According to this countermeasure, a repulsive fringe can be suppressed, and, when the auxiliary exposure amount is set in this state so that primary and repulsive fringes are made equal in degree to each other, the effect of the fringe control is further enhanced.

In the above-described fringe control of the potential dividing development method, the optimum measure for specifically realizing the multi-leveled amount of auxiliary exposure is not shown, and a driver for a light emitting element for the exposure must support a plurality of exposure amounts. Therefore, such a control has a problem in that the number of parts, the size, and the cost of a circuit for the driver (hereinafter, such factors are referred to as the circuit scale) are increased. In a case such as that where a semiconductor laser is used as the light emitting element and the process speed is high, particularly, a driver is required for each of the auxiliary exposure amounts, and a problem is produced in that the circuit scale is largely increased.

SUMMARY OF THE INVENTION

It is an object of the invention to provide a method of multi-leveling the auxiliary exposure amount which requires only a small circuit scale in the fringe control of the potential dividing development method.

It is another object of the invention to provide an excellent fringe suppressing performance which is free from a ghost, in a fringe controlling method using the multi-leveling methods.

In order to attain the objects, the invention basically provides an electrophotographic apparatus using a potential dividing development method in which developing processes respectively using colored particles of different kinds are performed by normal development and reversal development on two potential levels excluding an intermediate potential level, wherein the apparatus comprises an auxiliary exposing unit for forming a fringe development preventing potential in an edge of an image forming region in order to prevent a fringe development from occurring, and the auxiliary exposing unit sets an auxiliary exposure amount by performing pulse-width modulation on a laser driver.

In order to achieve an excellent fringe suppressing performance which is free from a ghost, an apparatus is proposed in which the amount of light emitted from a light source is set by using a driver for auxiliary exposure, and a light amount adjusting unit based on the pulse-width modulation method is further employed.

Furthermore, an apparatus is proposed in which at least one of auxiliary exposure lines in a sub scanning direction is different in pulse arrangement from adjacent auxiliary exposure lines.

As an auxiliary exposure unit for setting multi-level exposure amounts (two or more levels), a laser driver dedicated to auxiliary exposure may be used and a driving pulse for the driver may be pulse-width modulated, or a laser driver for forming the intermediate potential or that for forming a reversal image in which the exposure amount can be controlled may be used also for performing the pulse width modulation. In the latter case, for example, the laser driver for forming the intermediate potential may be used also for auxiliary exposure on a normal image, and the laser driver for reversal development may be used also for auxiliary exposure for forming a reversal image. Alternatively, the laser driver for reversal development may be used also for both auxiliary exposure on a normal image and that on a reversal image, and multi-level auxiliary exposure may be ensured by pulse-width modulation.

DETAILED DESCRIPTION OF THE PRESENT INVENTION

The present invention will be described in detail with reference to the accompanying drawings.

First Embodiment

A first embodiment of the invention will be described with reference to FIGS. 1 to 7.

Figure 1:
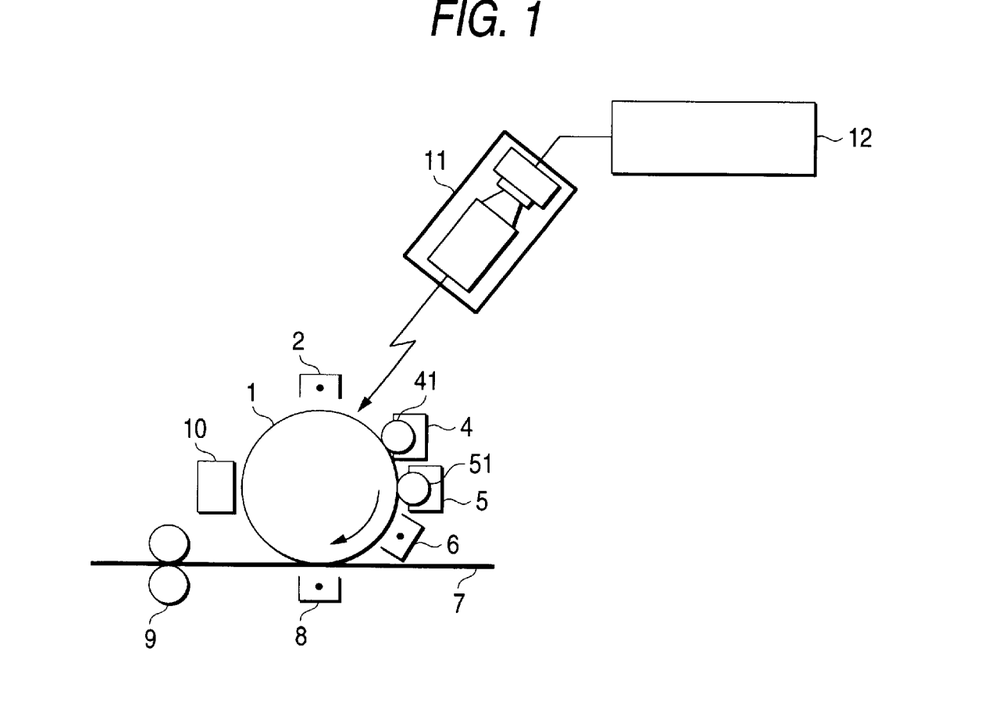
FIG. 1 is a sectional side view of a two-color laser printer using A potential dividing development method according to an embodiment of the invention.

FIG. 1 is a sectional side view of a two-color laser printer using the potential dividing development method of the embodiment. The reference numeral 1 denotes a photosensitive drum (referred to also as a photosensitive member or a recording medium), 2 denotes a charger, 4 denotes a first developing unit, 41 denotes a developing roll of the first developing unit 4, 5 denotes a second developing unit, 51 denotes a developing roll of the second developing unit 5, 6 denotes a pre-transfer charger, 7 denotes a printing sheet (recording medium), 8 denotes a transfer unit, 9 denotes a fixing unit (fixing roller), 10 denotes a cleaner, 11 denotes an exposure unit, and 12 denotes an exposure controlling unit.

An electrostatic latent image is formed by the exposure unit 11 consisting of a semiconductor laser the light emission of which is controlled by the exposure controlling unit 12 configured by a laser driver and the like, and an optical system, on the surface of the photosensitive drum 1 which has been charged uniformly by the charger 2 (in this example, the surface is negatively charged, and alternatively the surface may be positively charged). Basically, the exposure control has two kinds of exposure amounts respectively for forming a discharged region the potential of which is opposite to that of a charged region, and for forming an intermediate potential region which is to have a potential between the potentials of the charged and discharged regions, and additionally involves a control of an auxiliary exposure amount for a fringe control (the auxiliary exposure amount will be described later).

After the exposure, the electrostatic latent image (electrostatic latent image in the charged and discharged regions) is developed by the electric potential dividing development process using toners of two colors by the two developing units 4 and 5. Since the charge polarities of the two toners used in the development are different from each other, the pre-transfer charger 6 is used for unifying the polarities of the color toners. The toners of the two colors which have been unified in polarity by the pre-transfer unit 6 are transferred to the sheet 7 by the transfer unit 8. Thereafter, the transferred two-color toner image is heated and melted by the fixing unit 9 so as to be fixed onto the sheet 7. The toner which has not been transferred and remains on the surface of the photosensitive drum 1 is collected by the cleaner 10, thereby completing the series of processes.

Figure 2:
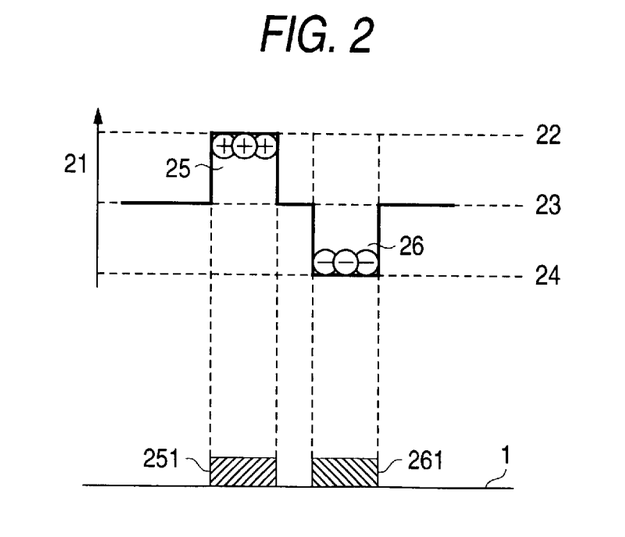
FIG. 2 is a diagram showing the potential distribution and image arrangement in the electric potential dividing development.

FIG. 2 is a diagram showing relationships between the potential distribution and image arrangement in the electric potential dividing development. The reference numeral 21 denotes the ordinate indicating the potential on the surface of the photosensitive member. The reference numeral 22 denotes the charge potential (Vo), 23 denotes the intermediate potential (Vw), 24 denotes the discharge potential (Vr), 25 denotes positively charged toners, 251 denotes a positively charged toner image (normal development image), 26 denotes negatively charged toners, and 261 denotes a negatively charged toner image (reversal development image).

In the photosensitive drum 1 which has been charged by the charger 2, the exposure amount is controlled in two steps by the exposure controlling unit 12 and the exposure unit 11 so that the photosensitive member surface potential 21 has three levels of Vo, Vw, and Vr. As a result, an unexposed portion [the charge potential (Vo) 22] in which normal development is to be performed by using the positively charged toners 25, a strongly exposed portion [the discharge potential (Vr) 24] in which reversal development is to be performed by using the negatively charged toners 26, and a weakly exposed portion [the intermediate potential (Vw) 23] in which development using either of the toners is not performed so as to provide a white image region are formed.

Hereinafter, a mechanism of generating a fringe, and the fringe control will be described.

Figure 3A:
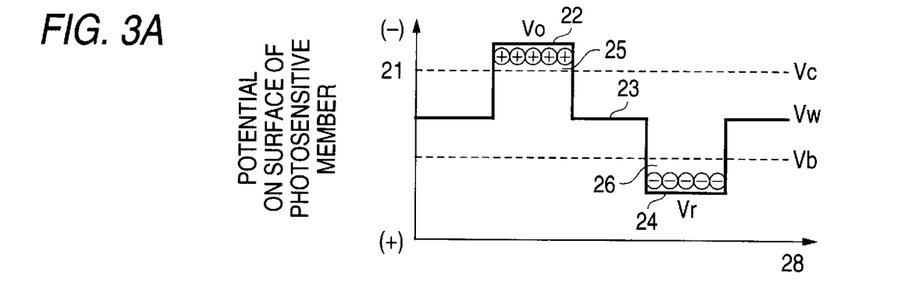
FIGS. 3A and 3B are diagrams showing the distributions of the surface potential and the surface electric field on a photosensitive member after exposure.
Figure 3B:
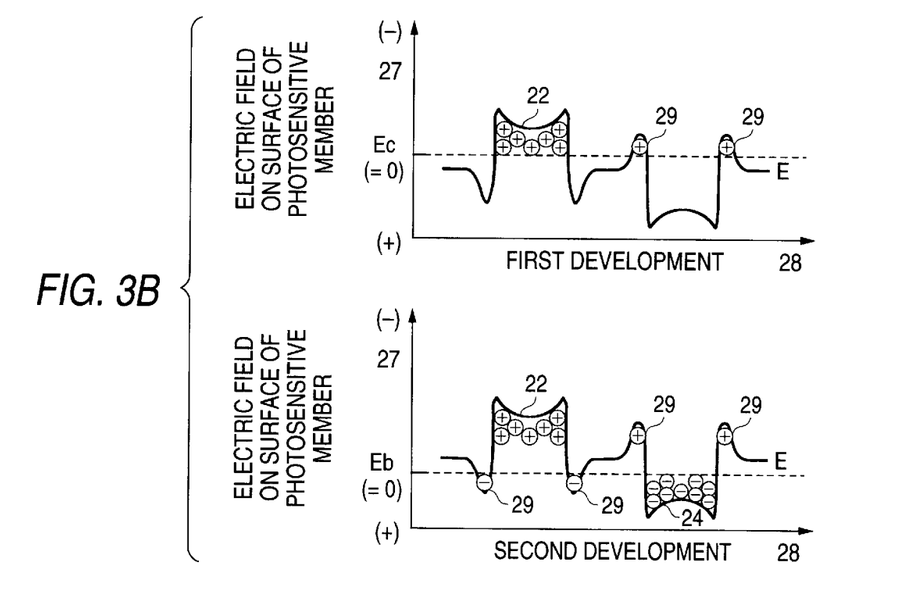

As described in the paragraph of the conventional art, additional fringe-like erroneous printing may be caused by a reverse electric field generated by auxiliary exposure used in the fringe control. In the specification, such erroneous printing is called a repulsive fringe. In order to distinguish from a repulsive fringe, a fringe which is caused when auxiliary exposure is not applied is called a primary fringe. When referred to merely as fringes, it generally means both kinds of fringes. FIGS. 3A and 3B are diagrams showing the distributions of the surface potential and the surface electric field on the photosensitive member after exposure, respectively.

In FIG. 3B, the upper portion shows the electric field distribution in the case where the first development (normal development) is performed, and the lower portion shows the electric field distribution in the case where the second development (reversal development) is performed.

FIGS. 3A and 3B show an example in which exposure for forming an unexposed portion (image region due to the normal development), a strongly exposed portion (image region due to the reversal development), and a weakly exposed portion (white image region) is performed. FIG. 3A shows the distribution of the surface potential of the photosensitive member after the exposure, and FIG. 3B is a diagram showing the distribution of the surface electric field of the photosensitive member after the exposure.

In FIGS. 3A and 3B, 21 denotes the surface potential of the photosensitive member, 22 denotes the charge potential Vo, 23 denotes the intermediate potential Vw, 24 denotes the discharge potential Vr, 25 denotes positively charged toners, 26 denotes negatively charged toners, and Vc and Vb are bias voltages which are to be applied to the first and second developing rolls 41 and 51. The bias voltage Vc is used in development of the normal image region (charged region 22), and the bias voltage Vb is used in development of the reversal image region (discharged region 24). The reference numeral 28 denotes a position in the surface of the photosensitive member 1, 27 in FIG. 3B denotes the surface electric field of the photosensitive member 1, and 29 denotes a primary fringe.

In the figures, E denotes the value of the electric field in the surface of the photosensitive member 1 which is formed between the photosensitive member 1 and the developing roll 41 or 51, and Ec and Eb denote the electric field the value of which is zero. The positively charged toners 25 are subjected to normal development in the range where the electric field distribution is higher than Ec, and the negatively charged toners 26 are subjected to reversal development in the range where the electric field distribution is lower than Eb. Therefore, the relative positions of Ec and Eb in the distribution of the electric field E are vertically moved in proportion to changes of the bias voltages Vc and Vb.

From the viewpoint of the potential shown in FIG. 3A, when the normal/reversal bias development is performed by the photosensitive member surface potential and the bias voltage Vc or Vb, there seems to be no problem. However, the development is actually performed by an electric field which is formed by spatially differentiating the potential distribution. As seen from FIG. 3B, when no consideration is given, therefore, a reverse electric field is produced in an end portion (edge portion) of each of the image regions (latent image regions), i.e., a region in which the electric field is emphasized correspondingly with positions where the potential is changed, and in adjacent to the field emphasized region. In the bias development, in the case where the development is performed by using only one kind of toner, only one of the normal and reversal developments is performed, and hence the electric field enhancement in the edge portions appears only as an enhancement (increasing) of the image density in the edge portions of a development image.

By contrast, in the case where the potential dividing development method is employed in order to conduct two-color printing, development using toners of the opposite kind may be sometimes caused by the reverse electric field produced in a white image region. This phenomenon is called fringe development.

When the absolute value of the bias Vc is raised, the whole electric field E is lowered, with the result that the position of Ec is relatively raised. Therefore, the primary fringe around the reversal development image 24 is reduced. When the absolute value of the bias Vb is lowered, the position of Eb with respect to the electric field E is relatively lowered. Therefore, the primary fringe around the normal development image 22 is reduced. When the absolute value of the bias Vc is raised or the absolute value of the bias Vb is lowered as described above, the potential difference between the normal development potential Vo or Vr and the bias is reduced or the development power is lowered. Therefore, such adjustment of the bias absolute value is naturally limited. To comply with this, the auxiliary exposure control is performed as described below.

Figure 4:
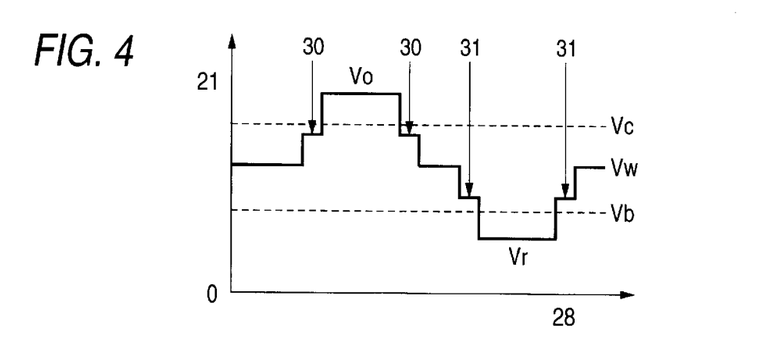
FIG. 4 is a diagram showing an example of the potential distribution in the surface of the photosensitive member in the case where an auxiliary exposure control is applied.

FIG. 4 is a diagram showing an example of the distribution of the photosensitive member surface potential 21 in the case where the exposure control (auxiliary exposure) is applied in order to eliminate a fringe, and where the exposure control is performed on image edges of both the normal and reversal development regions.

The reference numeral 30 denotes auxiliary exposure which is applied to edges of the normal development region, and 31 denotes auxiliary exposure which is applied to edges of the reversal development region. The purpose of the exposure controls is to moderate the electric field strength (gradient of the electric field) around an image Specifically, as shown in FIG. 4, the potential around the image (electrostatic latent image) is stepwise controlled by the exposure. As a result of this control, the potentials of the edges are lowered, whereby the reverse electric field produced around the image is weakened to suppress the occurrence of a primary fringe.

Figure 5:
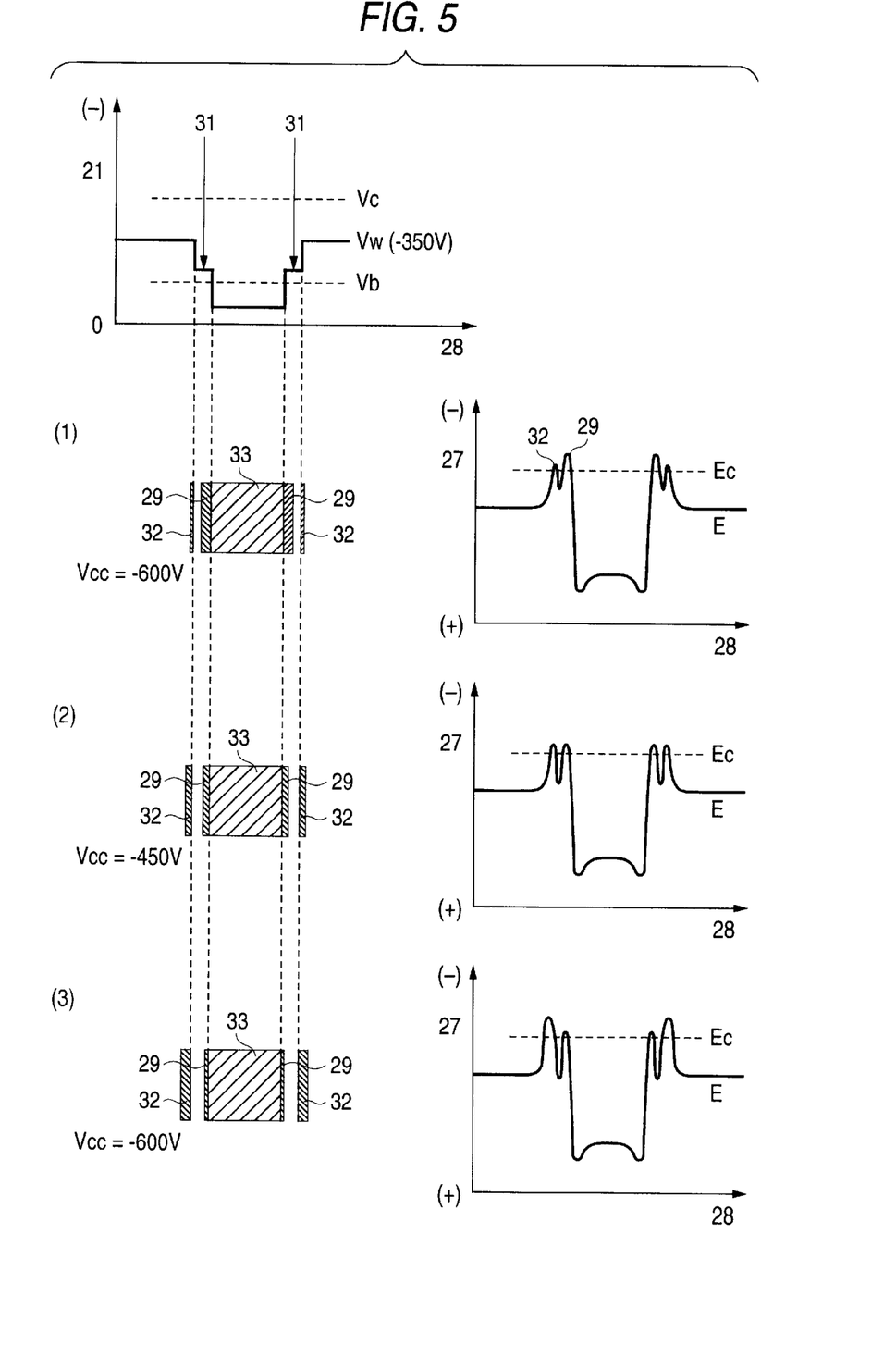
FIG. 5 is a diagram showing output images and corresponding electric field distributions in the case where an auxiliary exposure control is applied to suppress primary fringes and produce repulsive fringes.

FIG. 5 is a diagram showing output images and corresponding electric field distributions in the case where the occurrence rates of primary fringes 29 and repulsive fringes 32 caused when auxiliary exposure is applied are changed. For the sake of simplicity, in this case, the auxiliary exposure control is applied only to reversal development, and Vc is lowered so that primary fringes 29 are produced in a normal development image. The reference numeral 33 denotes a development image.

In FIG. 5, (1) shows a case where the auxiliary exposure 31 is performed with reducing the light intensity, (3) shows a case where the auxiliary exposure 31 is performed with increasing the light intensity, and (2) shows a case where the auxiliary exposure 31 is performed with the light intensity which is between the light intensities of (1) and (3). The symbol Vcc indicates a voltage at which both the primary fringe 29 and the repulsive fringe 32 are eliminated by changing the absolute value of the bias voltage Vc The voltage Vcc is lowered when the auxiliary exposure 31 is appropriately performed as in the case of (2). The reason for this is that the peak values of the reverse electric fields in the primary fringe 29 and the repulsive fringe 32 become approximately equal to each other, and consequently the two peak values themselves are reduced. In the cases of (1) and (3), one of the reverse electric fields of the primary fringe 29 and the repulsive fringe 32 is low, the other one is high, and the degree of one of the primary fringe 29 and the repulsive fringe 32 becomes large. Therefore, the absolute value of Vcc can be lowered at the maximum degree (in other words, the development power can be reserved at the highest degree) by adjusting both the primary fringe 29 and the repulsive fringe 32 so as to become approximately equal to each other. Among conditions where the auxiliary exposure amount level is fixed, it is possible to attain the maximum effect of the fringe control.

The degrees of the primary fringe 29 and the repulsive fringe 32 may be evaluated in the following manner. The absolute value of Vc is lowered (in the case of the periphery of a normal development image, the absolute value of Vc is raised), so that the primary fringe 29 and the repulsive fringe 32 are produced in a positive manner. The degrees are evaluated in accordance with their widths, reflection densities, color differences, and the amounts of attached toners or products of these values FIG. 5 shows a case where the auxiliary exposure amount is set to one level.

In the above, the fundamentals of the potential dividing development method, a fringe, and the fringe control have been described in detail. Hereinafter, the fringe control in the embodiment will be described.

In the embodiment, with respect to one of the normal/reversal development methods, the auxiliary exposure amount is set to three levels. The effect of the fringe control in the case where the auxiliary exposure amount is set to three levels as in the embodiment will be described with taking the case where an exposure control is applied to reversal development, as an example.

Figure 6:
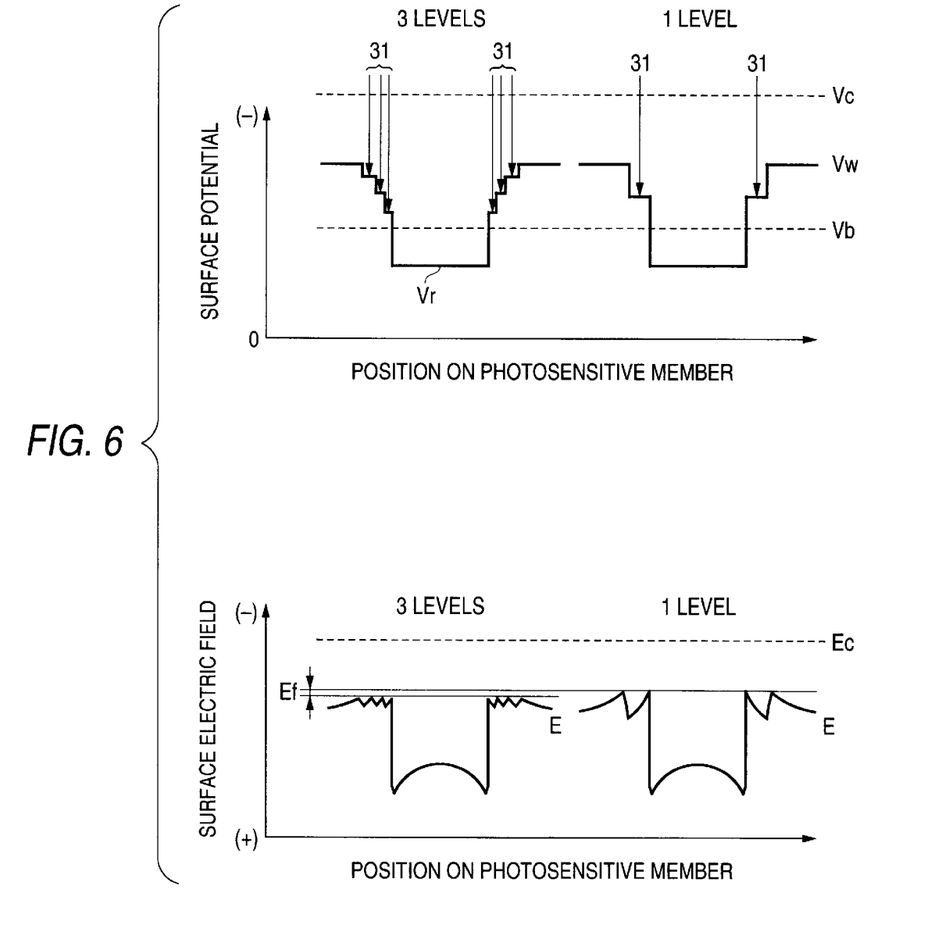
FIG. 6 is a diagram showing the distribution of the electric field in the case where the auxiliary exposure amount is set to multi levels.

FIG. 6 is a diagram showing the distributions of the potential and the electric field in the case where the auxiliary exposure amount is set to multi levels. In the figure, a case where the auxiliary exposure amount is set to three levels, and that where the auxiliary exposure amount is set to one level are shown. The symbol Ef indicates the difference in effect between a case where the auxiliary exposure amount is set to one level, and that where the auxiliary exposure amount is set to three levels. In the case of three levels, the peak of the electric field in the periphery of an image is lower by Ef than that of the case of one level, and the effect of the fringe control is greater than that of the case of one level. When the auxiliary exposure amount is set to multi levels in this way or set steplessly as extension of the multi-leveling, a repulsive fringe can be further suppressed, and the effect of the fringe control can be further enhanced. In the invention, as a simple technique of multi-leveling the auxiliary exposure amount, a technique in which the auxiliary exposure amount is basically set by performing pulse-width modulation on a laser driver is proposed. In a laser printer which is not requested to operate at a high speed, a laser driver for forming a reversal image or that for forming the intermediate potential may be used also as a laser driver for auxiliary exposure which can be subjected to pulse-width modulation. By contrast, in a laser printer which is requested to operate at a high speed, a laser driver for auxiliary exposure must be prepared to perform the pulse width modulation for multi-leveling. Hereinafter, as the auxiliary exposing unit of the first embodiment, means conforming to a high-speed laser printer will be described.

A two-color laser printer of the embodiment has a one-dot time of 20 ns so as to operate at a very high speed. Therefore, a laser driver which supports multilevel light amounts cannot be used. Even if such a driver is available, the driver is bulky and expensive.

Since the one-dot time is very short, the shortest light emission pulse width in the case where the pulse width modulation is performed from the limit of the laser emission period is 10 ns or can be reduced to a half of the one-dot time at the maximum. In this case, when a laser driver dedicated to the auxiliary exposure is not provided and all the auxiliary exposure amounts are produced by using spatial extinction due to the pulse width modulation, i.e., when light is emitted at a large exposure amount similar to that in the case of a reversal image and at the shortest pulse width which is a half of the one-dot time, irregularities are locally caused in the potential due to the auxiliary exposure correspondingly with the exposure pulse, so that part of the potential is lower than Vb. As a result, there is a fear that a ghost occurs.

In the embodiment, in order to prevent such a ghost from occurring, a laser driver dedicated to the auxiliary exposure is used, and the following method is proposed. Among the auxiliary exposure amounts which are to be applied to a reversal development image (latent image), the light amount level for forming the potential which is remotest from the intermediate potential Vw is ensured by using a laser driver dedicated to the auxiliary exposure in which the pulse peak value is set to only one level and which is small and economical, at a pulse width of, for example, 100% (the duty ratio of 100%), and by continuous irradiation (in this case, the pulse peak value, i.e., the light intensity used in the auxiliary exposure is set to be lower than the pulse peak value used in reversal development so that the auxiliary exposure amount is smaller than the exposure amount of the reversal development). The other two light amount levels of the auxiliary exposure are ensured by pulse-width modulating the light amount of continuous light emission (the pulse width modulation is controlled so that the pulse width is smaller than that of auxiliary exposure which is remotest from the intermediate potential Vw) by using the laser driver dedicated to auxiliary exposure. (In this case, in addition to the pulse-width modulation of the light amount of continuous emission, the following control may be simultaneously conducted. The continuous emission is intermittently stopped, and the stopping time is changed. This control will be described later with reference to FIG. 7.) On the other hand, also in auxiliary exposure which is applied to a latent image for normal development, the light amount level of the auxiliary exposure in which the light amount level for forming the potential remotest from the intermediate potential can be set to only one level in the same manner as the latent image for reversal development is ensured by performing pulse-width modulation on the light amount of continuous emission. The exposure controlling unit 12 includes such a laser driver dedicated to auxiliary exposure.

Figure 7:
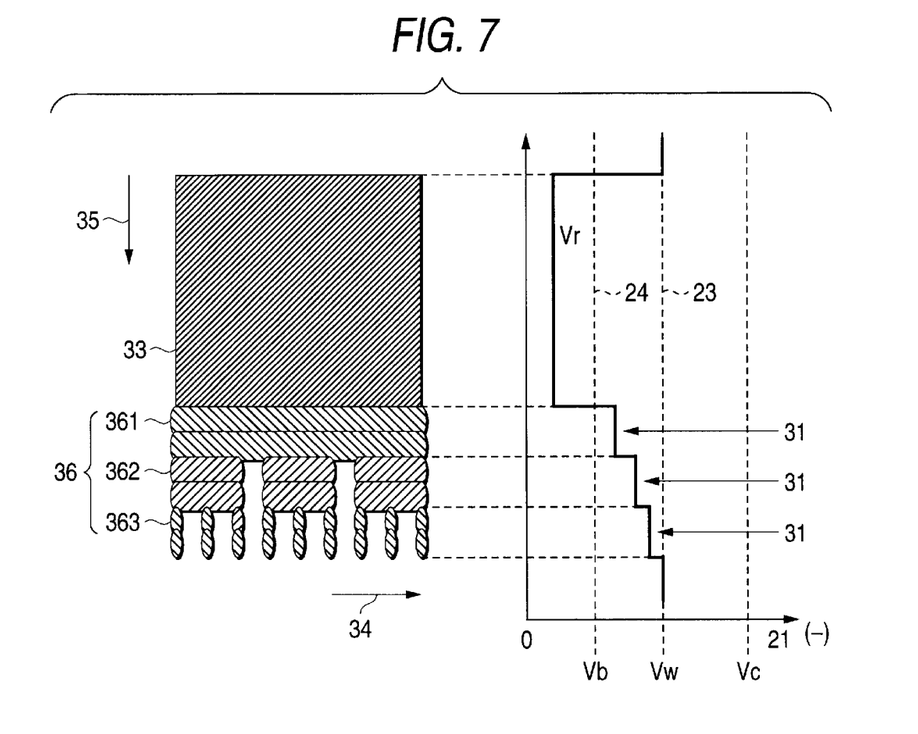
FIG. 7 is a diagram showing the multi-level pattern of auxiliary exposure and the photosensitive member surface potential in the auxiliary exposure.

FIG. 7 is a diagram showing the pulse arrangement of auxiliary exposure having three light amount levels in the embodiment. The reference numeral 33 denotes an image (for example, a reversal development image) which is formed by a large number of dots, 34 denotes the main scanning direction (the direction along which a laser beam is subjected to deflective scanning, i.e., the horizontal scanning direction), 35 denotes the sub scanning direction (the direction along which the recording medium is fed, i.e., the vertical scanning direction), 36 denotes auxiliary exposure pulses, 361 denotes an auxiliary exposure pulse which, among the auxiliary exposure pulses 36, forms the potential that is remotest from the intermediate potential 23 (Vw), 362 denotes an auxiliary exposure pulse which forms a potential that is closer by one step to the intermediate potential 23 than that formed by the auxiliary exposure pulse 361, and 363 denotes an auxiliary exposure pulse which forms a potential that is closer by one step to the intermediate potential 23 than that formed by the auxiliary exposure pulse 362. In the figure, as an example, the case where, in reversal development, six lines of auxiliary exposure are applied to the lower side of the development image 33 in the sub scanning direction is shown (the lower edge of the development image 33 has characteristics in which fringe development particularly tends to be produced). For the sake of reference, also the corresponding potential distribution is shown in the figure.

With respect to the auxiliary exposure pulse 361 which forms the potential that is remotest from the intermediate potential 23, the dedicated laser driver is used (the peak value of the pulse for driving the auxiliary exposure laser is lower than that of the pulse for forming an image), and the pulse width has a value corresponding to one dot. The pulse is continued for one dot, whereby continuous irradiation is performed over the whole region of the lower line of the development image 33 in the main scanning direction 34. In the auxiliary exposure pulse 362 which forms the potential that is closer by one step to the intermediate potential 23 than that formed by the pulse 361, continuous irradiation is performed with a pulse width corresponding to 0.5 dot, and portions where irradiation is not performed exist intermittently in the pulse. In the auxiliary exposure pulse 363 which forms the potential that is closer by one step to the intermediate potential 23 than that formed by the pulse 362, the pulse width has a value corresponding to 0.5 dot, and portions where irradiation is not performed exist intermittently in the pulse at a number which is larger than that of the portions in the auxiliary exposure pulse 362.

When the pulse-width modulation is used in the auxiliary exposure pulses 36 as described above (in this example, also the nonirradiation periods are intermittently disposed), the auxiliary exposure amount can be controlled, and potential regions of three steps between the discharge potential 24 corresponding to the development image 33 and the intermediate potential 23 can be formed in the lower edge of the development image. During the auxiliary exposure operation in which also the pulse-width modulation is performed, the driver for the intermediate potential is operated during periods (corresponding to the intermittent nonirradiation periods in the auxiliary exposure pulses 362 and 363) other than those when the driver for auxiliary exposure is operated. As a result, the surface of the photosensitive member under auxiliary exposure has a potential level which is between Vc and Vb. Therefore, the effect of preventing a ghost from occurring can be attained. Furthermore, auxiliary exposure of multi levels can be performed while setting the number and function of laser drivers to be identical with those of the case of auxiliary exposure of only one level (pulse peak value). Therefore, auxiliary exposure of multi levels can be performed in a circuit scale which is smaller than that in the case where different laser drivers are prepared for all light amount levels, respectively.

In the above, the embodiment (tri-level) in which, for one of normal/reversal developments, the auxiliary exposure amount is set to three levels has been described. The same effect can be attained also in the case of bi-level. When the auxiliary exposure amount is set to four or more levels or steplessly set, it is possible to attain an effect which is superior to that of the embodiment. Also when different numbers of levels of the auxiliary exposure amount are set for normal/reversal developments, the same effect can be attained.

Hereinafter, a modification of the embodiment will be described.

The basic configuration of this example is identical with that of the two-color laser printer of the above-described embodiment. In auxiliary exposure, the following method is employed. In the same manner as the embodiment, continuous irradiation is performed on each of latent images for normal/reversal development by using a laser driver dedicated to auxiliary exposure in which the light amount level for forming the potential that is remotest from the intermediate potential can be set to only one level (pulse peak level), and the other two light amount levels are produced by performing pulse-width modulation between the light amount of the continuous irradiation which is set by the laser driver, and that which is produced by a driver for the intermediate potential. In the embodiment described above, the one-pulse time in pulse width modulation is shorter than the one-dot time. By contrast, in the auxiliary exposure of the printer of this example, area modulation which is configured by a case where the one-pulse time in pulse width modulation coincides with the one-dot time, and that where the one-pulse time is longer than the one-dot time is performed. The continuous irradiation along an image of the two light amount levels is shorter in time than auxiliary exposure which is remotest from the intermediate potential. Namely, dot-pattern like exposure which is produced by the auxiliary exposure driver for normal/reversal developments is performed. Even when auxiliary exposure using large pulses is performed as described above, a ghost does not occur as far as a laser driver for auxiliary exposure is used.

It is a matter of course that the effect of suppressing a fringe can be attained in the same manner as Embodiment 1. Since the one-pulse time is equal to or longer than the one-dot time, it is not required to use a dedicated clock which is higher in frequency than the pixel clock, and a signal which is produced by the pixel clock can be used also in the auxiliary exposure.

In the embodiment described above, since a signal which is produced by the pixel clock can be used also as the pulse signal for the auxiliary exposure, auxiliary exposure of multi levels can be performed by a smaller circuit scale.

Next, the specific configuration of the embodiment will be described with reference to FIGS. 9 to 11.

Figure 9:
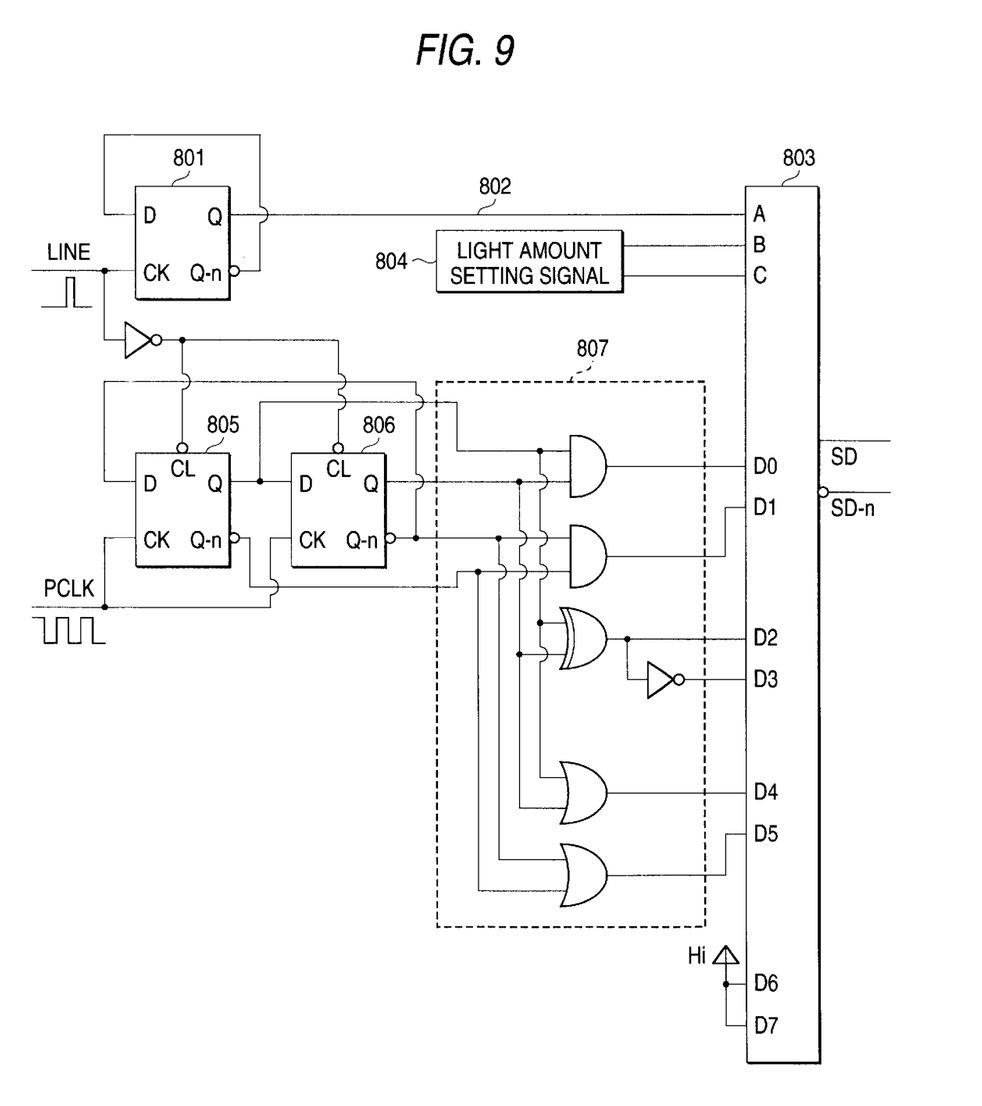
FIG. 9 is a diagram showing the configuration of a pulse arrangement generator.

FIG. 9 shows a specific configuration example of a pulse arrangement generator for auxiliary exposure which is used in the embodiment.

The generator receives a line synchronization pulse LINE indicative of the beginning position of each line, and a pulse generation clock PLCK for determining the pulse width. The line synchronization pulse LINE is a known pulse signal which, in a conventional laser printer, is generated by a beam detector disposed in an optical path immediately before a laser beam scans the photosensitive member 1.

The pulse generation clock PLCK is a high-frequency clock which is produced at a predetermined timing after the line synchronization pulse LINE is generated, and similar to a known synchronous clock for recording dots. In the embodiment, the pulse generation clock PLCK is a clock of a period (10 nsec) which is a half of the period (20 nsec) of a synchronous clock for recording dots. A D-type flip-flop (hereinafter, abbreviated to D-FF) 801 receives the line synchronization pulse LINE, and supplies a signal 802 which is inverted at every line, to a selection terminal A of a selector 803. A light amount setting signal 804 supplied to the remaining selection terminals B and C. The light amount setting signal 804 is a signal which is obtained by extracting a fringe correcting region and the correction exposure value (auxiliary exposure amount) by a known pattern recognition circuit or the like D-FFs 805 and 806, and a logic circuit 807 receive the line synchronization pulse LINE and the pulse generation clock PLCK, and supplies pulse signals of six lines to input terminals D0, D1, D2, D3, D4, and D5 of the selector 803 Input terminals D6 and D7 are fixed to a high level Hi. On the basis of signals A, B, and C supplied to the selection terminals, the selector 803 selects one of signals D0, D1, D2, D3, D4, D5, D6, and D7 of the input terminals, and outputs an output signal SD and an inverted signal SD-n of the signal.

Figure 10:
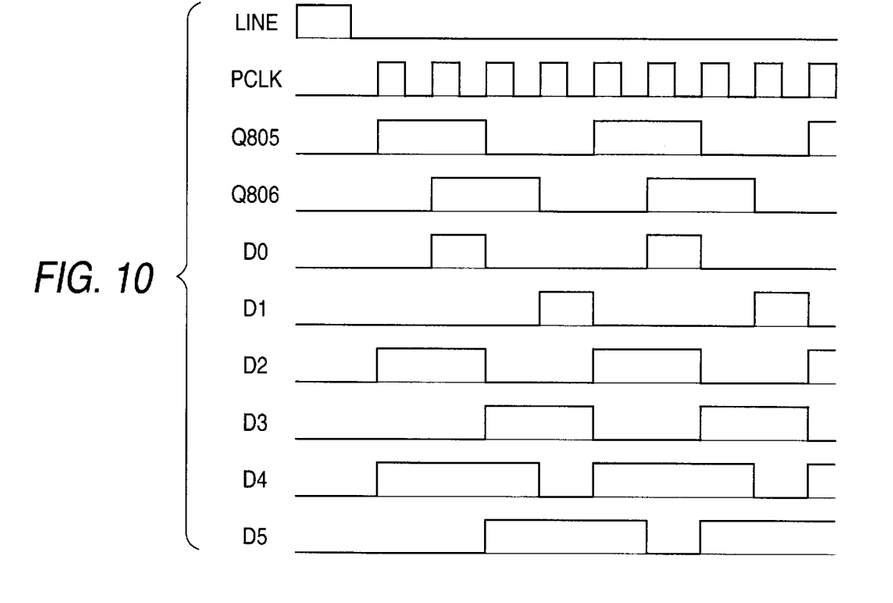
FIG. 10 is a view illustrating waveforms of signals which are produced by using the generator of FIG. 9.

FIG. 10 shows signal waveforms of the line synchronization pulse LINE, the pulse generation clock PLCK, outputs Q805 and Q806 of the D-FFs 805 and 806, and the signals D0, D1, D2, D3, D4, and D5. The signals D0 and D1 are pulses in which the pulse width duty ratio is 25% and which are shifted in phase from each other by 180 degrees, the signals D2 and D3 are pulses in which the pulse width duty ratio is 50% and which are shifted in phase from each other by 180 degrees, and the signals D4 and D5 are pulses in which the pulse width duty ratio is 75% and which are shifted in phase from each other by 180 degrees. The signals D6 and D7 are pulses in which the pulse width duty ratio is 100%. The phase relationships are switched over at every line by the signal 802 which is inverted at every line, and the pulse width duty ratios are switched over by the light amount setting signal 804. When these pulse signals are applied to FIG. 7, D4 and D5 (or D6 and D7) correspond to the auxiliary exposure line 361, D2 and D3 correspond to the auxiliary exposure line 362, and D0 and D1 correspond to the auxiliary exposure line 363.

Figure 11:
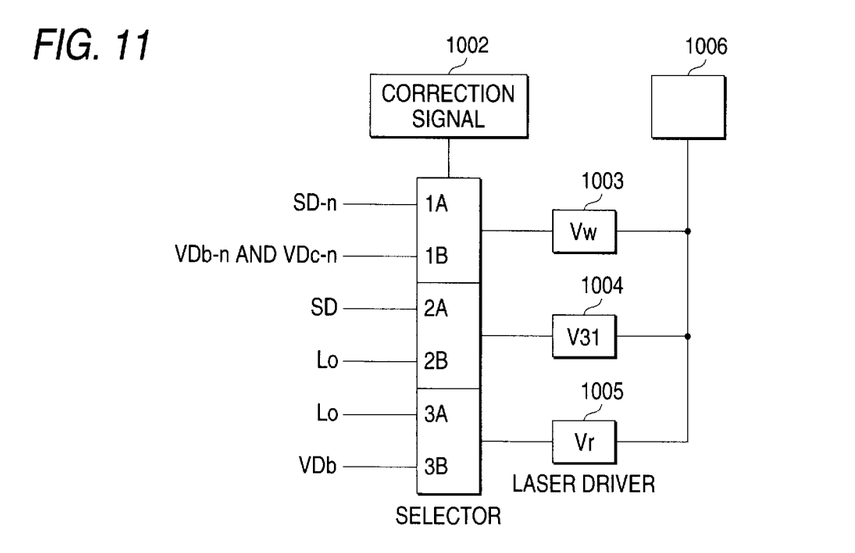
FIG. 11 is a diagram showing the configuration of a laser driver switching device.

FIG. 11 shows an example of the configuration of a laser driver switching device. In this example, a laser driver 1004 for auxiliary exposure in fringe correction of a reversal development image is shown. The reference numeral 1003 denotes a laser driver for forming the intermediate potential, and 1005 denotes a laser driver for reversal development.

The pulse signal SD and its inverted signal SD-n which are generated by the pulse arrangement generator of FIG. 9 are connected to input terminals 2A and 1A of a selector 1001, respectively. A signal which is obtained by a logical product AND of an inversion VDb-n of a black video signal and an inversion VDc-n of a red video signal, and which corresponds to the white image region 23 is input to an input terminal 1B. A low level Lo is input to input terminals 2B and 3A, and the black video signal VDb is input to an input terminal 3B. A correction signal 1002 which is obtained in the same manner as the light amount setting signal 804 is used as a selection signal. When the fringe correction is to be performed, the terminals 1A, 2A, and 3A are selected so as to cause the signals at the terminals to function as recording signals for the laser drivers 1003, 1004, and 1005. When the corresponding recording signal is ON, each of the laser drivers 1003, 1004, and 1005 supplies a current of a predetermined magnitude to a diode laser 1006 to set the surface potential of the photosensitive member 1 to Vw, V31, or Vr as shown in FIGS. 6 and 7. During the fringe correction, therefore, the laser drivers 1003 and 1004 are alternately operated at a ratio which is determined by the light amount setting signal 804. In fringe development, the responsibility with respect to the spatial frequency of an electric field is about 1 to 2 cycle/mm, and considerably lower than the pulse frequency of the signal SD. Therefore, the average of potentials on the photosensitive member produces the fringe correction effect. When the pulse width duty ratio is:

25%, 50%, or 75%, the potential on the photosensitive member is:

$0.25 \times V31 + 0.75 \times Vw$, $0.5 \times V31 + 0.5 \times Vw$, or $0.75 \times V31 + 0.25 \times Vw$.

Consequently, equivalent fringe correction effects are attained.

All of the above-mentioned correction potentials are not on the side of the black development bias voltage Vb but on the side of the white voltage Vw, and hence a ghost does not occur. In the embodiment described above, the fringe correction in the periphery of a black image produced by reversal development has been described. Also the opposite fringe correction, i.e., that in the periphery of a red image produced by normal development is performed in the same manner, and hence its description is omitted. The pulse generation clock PLCK is not required to be an integer multiple of the dot clock. As described above, all the correction potentials are potentials at which recording is not conducted. Even in a frequency which is lower than the dot clock, therefore, the fringe correction effect can be attained. When delay elements and the like are combined with the logic circuit, it is possible to realize more various kinds of pulse width duty ratios.

Second Embodiment

As another embodiment of the invention, an example of a laser printer in which a high-speed operation is not requested unlike the first embodiment described above is proposed. In the embodiment, in auxiliary exposure of an edge of a normal development image, the laser driver for forming the intermediate potential is used also as an auxiliary exposure unit for preventing fringe development from occurring. In auxiliary exposure of an edge of a reversal development image, the laser driver dedicated to auxiliary exposure or the laser driver for forming a reversal image may be used also as the auxiliary exposure unit (this will be described in the subsequent embodiment).

In the embodiment, the basic configuration and operation of the two-color laser printer using the potential dividing development method are identical with those of the two-color laser printer of Embodiment 1 shown in FIG. 1. However, the one-dot time is set to be longer than that in Embodiment 1 or 80 nsec.

In the embodiment, with respect to all light amount levels of auxiliary exposure on an edge of a normal development image (latent image), auxiliary exposure of multi levels is obtained by pulse-width modulating the light amount of continuous irradiation by using the laser driver for forming the intermediate potential, and in addition changing the interval of the nonirradiation periods.

In the embodiment, even when continuous irradiation is performed, the potential is equal at the maximum to the intermediate potential for forming a white image region, and hence a ghost does not occur. In the embodiment, the one-dot time is sufficiently long or 80 ns, and the shortest light emission pulse width in the case where the pulse width modulation is performed is 10 ns or can be finely time-divided to one eighth of the one-dot time. Even when nonirradiation periods exist in the pulse-width modulation, therefore, local potential irregularities corresponding to exposure pulses are spatially averaged, with the result that a potential between Vc and Vo is not generated and there is no fear that a ghost occurs.

According to the embodiment described above, the laser driver for the intermediate potential is used also for auxiliary exposure on a latent image for normal development, and hence the number of laser drivers can be reduced. Therefore, it is possible to attain an effect that auxiliary exposure of multi levels can be performed by a further reduced circuit scale. Even when continuous irradiation is performed, the potential is equal to the intermediate potential. Therefore, another effect that a ghost is prevented from occurring can be attained.

Third Embodiment

As a further embodiment of the invention, an example of a laser printer in which a high speed operation of a laser printer is not requested (the one-dot time is 80 ns) as in the second embodiment is proposed. In the embodiment, in auxiliary exposure of an edge of a normal development image, the laser driver for forming the intermediate potential is used also as an auxiliary exposure unit for preventing fringe development from occurring, and, in auxiliary exposure of an edge of a reversal development image, the laser driver for forming a reversal image is used also as the auxiliary exposure unit.

In the embodiment also, the basic configuration and operation of the two-color laser printer using the potential dividing development method are identical with those of the embodiments described above, and the auxiliary exposure operation on a normal development image is identical with that of the second embodiment.

In the embodiment, a method is employed in which all light amount levels of auxiliary exposure on an edge of a reversal development image (latent image) are produced by performing the pulse-width modulation. The laser driver for producing a latent image for reversal development is used also as a laser driver for the modulation. In the embodiment also, the one-dot time is sufficiently long or 80 ns, and the shortest light emission pulse width in the case where the pulse width modulation is performed is 10 ns or can be finely time-divided to one eighth of the one-dot time. Consequently, local potential irregularities corresponding to exposure pulses are spatially averaged, with the result that a potential which is lower than Vb is not generated and there is no fear that a ghost occurs.

According to the embodiment, the laser drivers for forming an image (the laser driver for forming the intermediate potential and the laser driver for forming the intermediate potential) are used also for auxiliary exposure on both normal and reversal developments, and hence the number of laser drivers can be reduced. Therefore, it is possible to attain an effect that auxiliary exposure of multi levels can be performed by a further reduced circuit scale, and another effect that a ghost is prevented from occurring can be attained.

Fourth Embodiment

Figure 8:
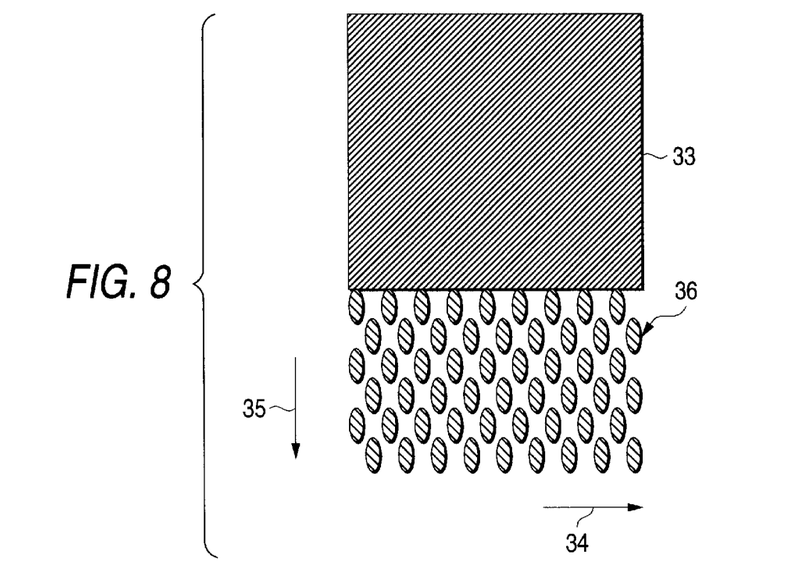
FIG. 8 is a diagram showing another arrangement of auxiliary exposure.

FIG. 8 is a diagram showing an arrangement pattern of auxiliary exposure in a further embodiment.

In the embodiment also, the invention is applied to a two-color laser printer using the potential dividing development method, and the basic configuration and operation are identical with those of the embodiments described above. The one-dot time is 20 ns, the pulse width modulation is used in the auxiliary exposure, and the shortest light emission pulse width in the case where the pulse-width modulation is performed is 10 ns.

The reference numeral 34 denotes the main scanning direction, 35 denotes the sub scanning direction, and 36 denotes auxiliary exposure pulses FIG. 8 also shows the case where six lines of auxiliary exposure are applied to the lower side of the image 33 in the sub scanning direction. In the embodiment, an example in which multi-leveling of auxiliary exposure is not required is shown. Namely, the strictly same auxiliary exposure is performed for each line. In the auxiliary exposure of the embodiment, the pulse arrangement in the sub scanning direction is formed in a staggered manner so that pulses are uniformly distributed over an area.

When pulses form in a line in the sub scanning direction, a fringe is linearly suppressed in a ½-dot width, and the fringe suppressing effect is insufficient in valleys of the vertical pulse arrangement, thereby producing a possibility that a whisker-like primary fringe (ghost) which thinly elongates in the sub scanning direction occurs. The embodiment solves this problem.

In the embodiment, the pulse arrangements in lines which are adjacent in the sub scanning direction are different from each other. Therefore, vertical pulse arrangement in the sub scanning direction can be prevented from being produced, and a primary fringe due to an uneven fringe suppressing effect can be prevented from occurring. In the embodiment, auxiliary exposure pulses are arranged in a staggered manner. Also in a configuration in which at least one of auxiliary exposure lines in the sub scanning direction is different in pulse arrangement from adjacent auxiliary exposure lines, the same effects can be attained.

According to the invention described above, since the light amount adjusting unit based on the pulse-width modulation is used in auxiliary exposure in a fringe control of the potential dividing development method, auxiliary exposure of multi levels can be performed while setting the number and function of laser drivers to be identical with those of the case of auxiliary exposure of only one level. Therefore, an effect that the auxiliary exposure amount can be multi-leveled while setting the circuit scale to be small can be attained.

Furthermore, the amount of light emitted from a light source is set by using a driver for auxiliary exposure, and a light amount adjusting unit based on the pulse-width modulation method is employed. Therefore, it is possible to set an exposure amount at which, even when continuous irradiation is performed, the potential is not lower than the bias potential for reversal development, thereby attaining an effect that a ghost is prevented from occurring.

Moreover, at least one of auxiliary exposure lines in the sub scanning direction is different in pulse arrangement from adjacent auxiliary exposure lines Therefore, vertical pulse arrangement in the sub scanning direction can be prevented from being produced, and an excellent fringe suppressing performance which is free from a ghost can be obtained.

What is claimed is:

1. An electrophotographic apparatus comprising:

a photosensitive member;

an exposing device for exposing the photosensitive member to light and charging the photosensitive member to form at least three regions of a high potential region, an intermediate potential region and a low potential region on the photosensitive member;

a developing device for developing the high potential region and the low potential region respectively using different colored particles by normal development and reversal development; and an exposing device controller for controlling the exposing device to change the amount of exposing light for each of the three regions, wherein the exposing device controller has a laser driver for controlling the exposing device to form a fringe development preventing potential in an edge of at least one of the three regions and to prevent fringe development from occurring therein; and the laser driver performs pulse-width modulation to control an auxiliary exposure amount at the time of forming the fringe development preventing potential, wherein the fringe development preventing potential has two or more potential levels which are changed stepwise or continuously; and the laser driver performs the pulse-width modulation in accordance with a change of the potential of two or more levels.

2. The electrophotographic apparatus according to claim 1, wherein the laser driver is specifically designed for forming the fringe development preventing potential in the edge of at least one of the high potential region and the low potential region.

3. The electrophotographic apparatus according to claim 2, wherein a one-pulse time of the pulse width modulation at the time of forming the fringe development preventing potential is shorter than a one-dot time at the time of forming the three potential regions.

4. The electrophotographic apparatus according to claim 2, wherein a one-pulse time of the pulse width modulation at the time of forming the fringe development preventing potential is equal the one-dot time.

5. The electrophotographic apparatus according to claim 2, wherein a one-pulse time of the pulse width modulation at the time of forming the fringe development preventing potential is more than the one-dot time.

6. An electrophotographic apparatus comprising: a photosensitive member;

an exposing device for exposing the photosensitive member to light and charging the photosensitive member to form at least three regions of a high potential region, an intermediate potential region and a low potential region on the photosensitive member;

a developing device for developing the high potential region and the low potential region respectively using different colored particles by normal development and reversal development; and an exposing device controller for controlling the exposing device to change the amount of exposing light for each of the three regions, wherein the exposing device controller has a laser driver for controlling the exposing device to form a fringe development preventing potential in an edge of at least one of the three regions and to prevent fringe development from occurring therein; and the laser driver performs pulse-width modulation to control an auxiliary exposure amount at the time of forming the fringe development preventing potential, wherein at least one of auxiliary exposure lines in a sub scanning direction is different in pulse arrangement from adjacent auxiliary exposure lines.

* * * * *